US010853653B2

(12) United States Patent
Dimitriadis et al.

(10) Patent No.: US 10,853,653 B2
(45) Date of Patent: *Dec. 1, 2020

(54) EXPLOITING VISUAL INFORMATION FOR ENHANCING AUDIO SIGNALS VIA SOURCE SEPARATION AND BEAMFORMING

(71) Applicant: AT&T Intellectual Property I, L.P., Atlanta, GA (US)

(72) Inventors: Dimitrios Dimitriadis, Rutherford, NJ (US); Donald J. Bowen, Madison, NJ (US); Lusheng Ji, Randolph, NJ (US); Horst J. Schroeter, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,476

(22) Filed: Aug. 30, 2019

(65) Prior Publication Data
US 2019/0384979 A1    Dec. 19, 2019

Related U.S. Application Data

(63) Continuation of application No. 15/905,442, filed on Feb. 26, 2018, now Pat. No. 10,402,651, which is a
(Continued)

(51) Int. Cl.
*G06K 9/00* (2006.01)
*G10L 21/0208* (2013.01)
(Continued)

(52) U.S. Cl.
CPC ......... *G06K 9/00684* (2013.01); *G06F 3/165* (2013.01); *G10L 21/0208* (2013.01);
(Continued)

(58) Field of Classification Search
CPC . G06K 9/00684; G06F 3/165; G10L 21/0208; G10L 21/02; H04R 5/04;
(Continued)

(56) References Cited

U.S. PATENT DOCUMENTS 5,893,059 A    4/1999    Raman
5,970,446 A    10/1999   Goldberg et al.
(Continued)

FOREIGN PATENT DOCUMENTS

EP    1375084    1/2004

*Primary Examiner* — Fan S Tsang
*Assistant Examiner* — David Siegel
(74) *Attorney, Agent, or Firm* — Amin, Turocy & Watson, LLP

(57) ABSTRACT

A system for exploiting visual information for enhancing audio signals via source separation and beamforming is disclosed. The system may obtain visual content associated with an environment of a user, and may extract, from the visual content, metadata associated with the environment. The system may determine a location of the user based on the extracted metadata. Additionally, the system may load, based on the location, an audio profile corresponding to the location of the user. The system may also load a user profile of the user that includes audio data associated with the user. Furthermore, the system may cancel, based on the audio profile and user profile, noise from the environment of the user. Moreover, the system may include adjusting, based on the audio profile and user profile, an audio signal generated by the user so as to enhance the audio signal during a communications session of the user.

20 Claims, 4 Drawing Sheets

Related U.S. Application Data continuation of application No. 14/302,110, filed on Jun. 11, 2014, now Pat. No. 9,904,851.

(51) Int. Cl.
*G06F 3/16* (2006.01)
*H04R 5/04* (2006.01)

(52) U.S. Cl.
CPC ............ *H04R 5/04* (2013.01); *H04R 2430/20* (2013.01); *H04R 2460/07* (2013.01)

(58) Field of Classification Search
CPC ............ H04R 2430/20; H04R 2460/07; H04R 1/1083; G10K 11/178
See application file for complete search history.

(56) References Cited

U.S. PATENT DOCUMENTS

| | | |
|---|---|---|
| 6,519,563 B1 | 2/2003 | Lee et al. |
| 7,224,981 B2 | 5/2007 | Deisher et al. |
| 7,496,509 B2 | 2/2009 | Navratil et al. |
| 7,684,982 B2 | 3/2010 | Taneda |
| 7,974,841 B2 | 7/2011 | Bengtsson |
| 8,155,394 B2 | 4/2012 | Allegra et al. |
| 8,265,928 B2 | 9/2012 | Kristjansson et al. |
| 8,428,940 B2 | 4/2013 | Kristjansson et al. |
| 8,660,842 B2 * | 2/2014 | Raux ...................... G10L 15/07 704/233 |
| 8,666,740 B2 | 3/2014 | Lloyd et al. |
| 2002/0107694 A1 | 8/2002 | Lerg |
| 2006/0053014 A1 | 3/2006 | Yoshizawa |
| 2006/0224382 A1 | 10/2006 | Taneda |
| 2008/0208581 A1 | 8/2008 | Pelecanos et al. |
| 2008/0300871 A1 | 12/2008 | Gilbert |
| 2008/0312918 A1 | 12/2008 | Kim |
| 2011/0141106 A1 | 6/2011 | Runge et al. |
| 2011/0161076 A1 | 6/2011 | Davis et al. |
| 2011/0300806 A1 * | 12/2011 | Lindahl ............... G10L 21/0208 455/63.1 |
| 2012/0123776 A1 | 5/2012 | Agapi et al. |
| 2012/0182429 A1 * | 7/2012 | Forutanpour .......... H04R 3/005 348/175 |
| 2013/0238332 A1 | 9/2013 | Chen |
| 2013/0297313 A1 | 11/2013 | Lloyd et al. |
| 2014/0016835 A1 | 1/2014 | Song et al. |
| 2014/0039888 A1 | 2/2014 | Taubman et al. |
| 2014/0088961 A1 | 3/2014 | Woodward et al. |
| 2014/0114665 A1 * | 4/2014 | Murgia ............... G10L 21/0216 704/275 |

* cited by examiner

EXPLOITING VISUAL INFORMATION FOR ENHANCING AUDIO SIGNALS VIA SOURCE SEPARATION AND BEAMFORMING

CROSS-REFERENCE TO RELATED APPLICATION

This application is a continuation of U.S. patent application Ser. No. 15/905,442 filed Feb. 26, 2018, which is a continuation of and claims priority to U.S. patent application Ser. No. 14/302,110, filed Jun. 11, 2014, now U.S. Pat. No. 9,904,851, each of which are hereby incorporated by reference in their entireties.

FIELD OF THE INVENTION

The present application relates to technologies for noise suppression, speech recognition, and acoustics, and more particularly, to a system for exploiting visual information for enhancing audio signals via source separation and beamforming.

BACKGROUND

In today's society, end users regularly utilize smartphones, speech recognition systems, and other audio-based technologies to place and receive phone calls, access various types of internet services, and perform a variety of functions, or a combination thereof. When an end user communicates using such devices and technologies, the end user may be located in an environment that may not provide for optimal communication conditions. For example, the environment may include ambient noises, such as, but not limited to, noises generated from land vehicles, noises generated by aircraft, noises generated by machinery, and noises generated by animals. Additionally, the environment may also include other competing users, who may be speaking or otherwise making sounds that may interfere with the communications made by the end user.

Currently, in order to counteract such ambient noise and noise generated from competing users, noise suppression algorithms and technologies have been utilized to separate a targeted end user's audio signals from the ambient noise and from the competing users' interfering audio signals. However, current noise suppression algorithms and technologies often do so only by predefining the locations of the sources of the ambient noise, the location of the targeted end user, and the locations of competing users. Additionally, current technologies require the use of a defined time period to phase in and adapt to various provided constraints. Furthermore, current technologies fail to use any knowledge of the end user or the acoustic environment associated with the end user. As a result, current noise adaptation processes often require significant amounts of time, are often suboptimal based on computational and algorithmic constraints, and often require significant usage of limited resources.

SUMMARY

A system and accompanying methods for exploiting visual information for enhancing audio signals via source separation and beamforming are disclosed. In particular, the system and methods may allow for using metadata extracted from visual, audio, or other content associated with an environment of a user to be used in improving the speed and efficiency of noise suppression algorithms. In order to accomplish this, the system and methods may include utilizing visual sensors, cameras, audio sensors, and other similar devices to capture visual and audio content associated with an acoustic environment that the user is located in. Metadata extracted from the captured visual and audio content may be utilized by the system and methods to identify the user's location and to load a pre-trained audio profile including information associated with the current noise conditions in the acoustic environment. In parallel, the system and methods may include loading a user profile for the user, which may include corresponding audio information that is associated with the user.

Once the audio profile and user profile are loaded, the system and methods may include using the audio profile and user profile to cancel noise generated in the acoustic environment and noise generated by competing speakers in the environment so as to increase the quality of communications by the user. The audio and user profiles may also be utilized to enhance audio signals generated by the user during various types of communications sessions, such as, but not limited to, telephone communications sessions, communications sessions involving automatic speech recognition, or any other type of communications sessions. As a result, the system and methods may utilize visual, auditory, and other information associated with users and acoustic environments to allow for improvements in the efficiency and speed of noise suppression algorithms.

In one embodiment, a system for exploiting visual information for enhancing audio signals via for source separation and beamforming is disclosed. The system may include a memory that stores instructions and a processor that executes the instructions to perform various operations of the system. The system may perform an operation that includes obtaining visual content associated with an environment of a user. The system may then perform an operation that includes extracting, from the visual content, first metadata associated with the environment of the user. Once the first metadata is extracted, the system may perform an operation that includes determining a location of the user based on the first metadata. Based on the location, the system may perform an operation that includes loading an audio profile corresponding to the location of the user. Additionally, the system may perform an operation that includes loading a user profile of the user that includes audio data associated with the user. Furthermore, the system may include cancelling, based on the audio profile and the user profile, noise from the environment of the user. Moreover, the system may include adjusting, based on the audio profile and the user profile, an audio signal generated by the user so as to enhance the audio signal during a communications session of the user.

In another embodiment, a method for enhancing audio signals via exploiting visual information for source separation and beamforming is disclosed. The method may include utilizing a memory that stores instructions, and a processor that executes the instructions to perform the various functions of the method. The method may include obtaining visual content associated with an environment of a user. The method may then include extracting, from the visual content, first metadata associated the environment of the user, and determining a location of the user based on the first metadata. Additionally, the method may include loading, based on the location, an audio profile corresponding to the location of the user and loading a user profile of the user. The user profile may be configured to include audio data associated with the user. Furthermore, the method may include cancelling, based on the audio profile and the user profile, noise from the environment of the user. Moreover, the method may include adjusting, based on the audio profile and the user profile, an audio signal generated by the user so as to enhance the audio signal during a communications session of the user.

According to yet another embodiment, a computer-readable device having instructions for exploiting visual information for enhancing audio signals via source separation and beamforming is provided. The computer instructions, which when loaded and executed by a processor, may cause the processor to perform operations including: obtaining visual content associated with an environment of a user; extracting, from the visual content, first metadata associated the environment of the user; determining a location of the user based on the first metadata; loading, based on the location, an audio profile corresponding to the location of the user; loading a user profile of the user, wherein the user profile comprises audio data associated with the user; cancelling, based on the audio profile and the user profile, noise from the environment of the user; and adjusting, based on the audio profile and the user profile, an audio signal generated by the user so as to enhance the audio signal during a communications session of the user.

These and other features of the systems and methods for exploiting visual information for enhancing audio signals via source separation and beamforming are described in the following detailed description, drawings, and appended claims.

DETAILED DESCRIPTION OF THE INVENTION

Figure 1:
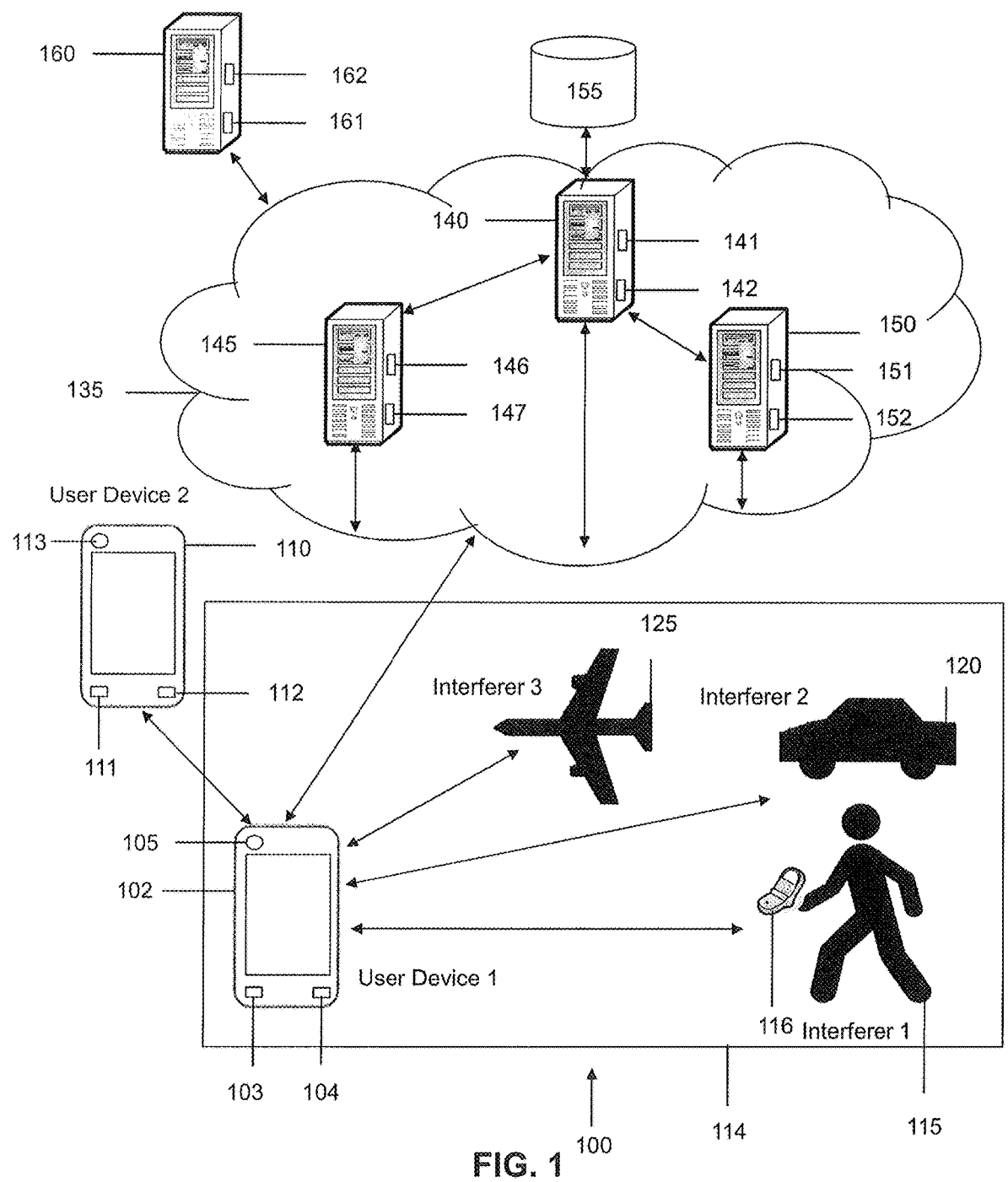
FIG. 1 is a schematic diagram of a system for exploiting visual information for enhancing audio signals via source separation and beamforming according to an embodiment of the present disclosure.
Figure 2:
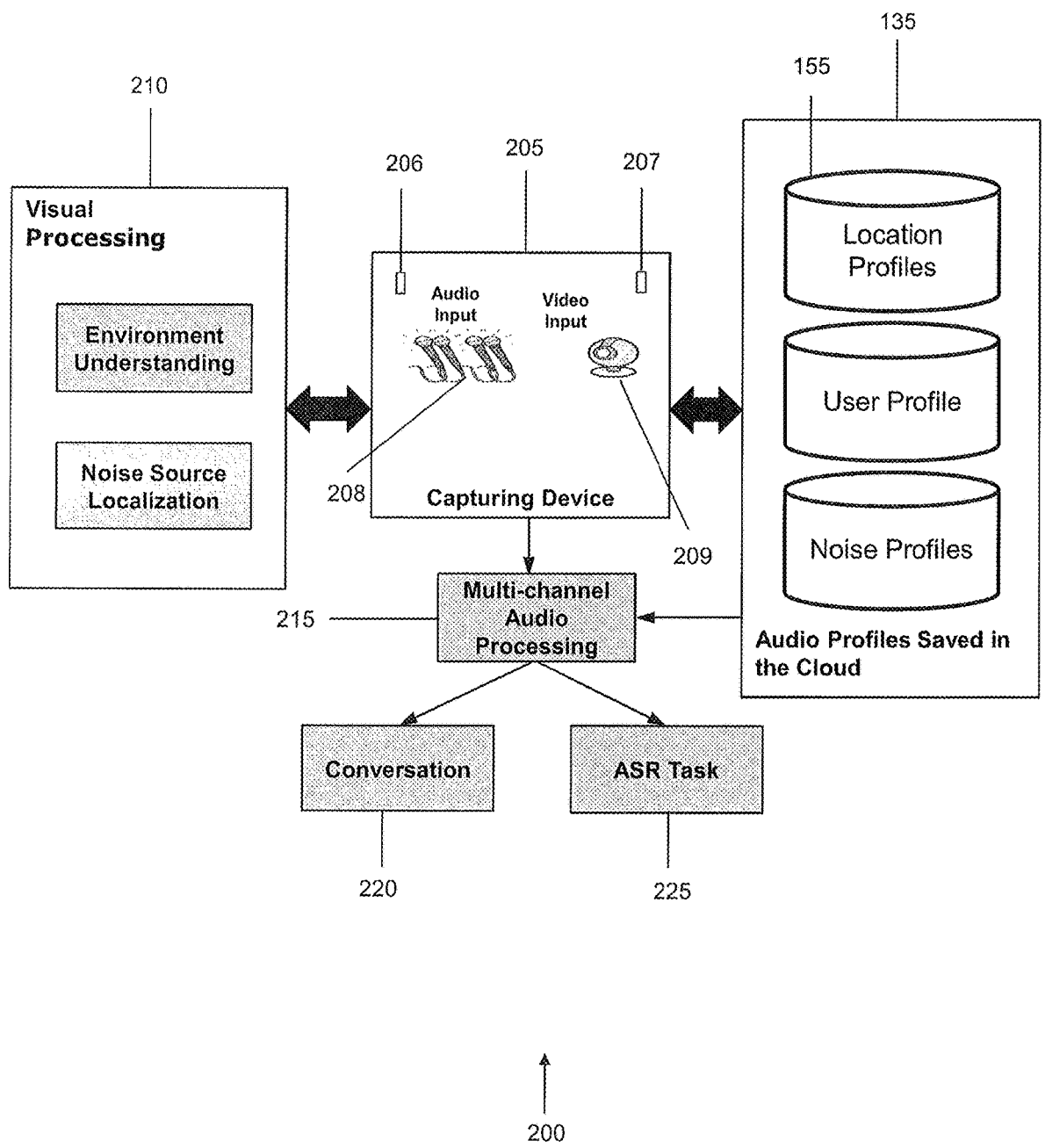
FIG. 2 is a schematic diagram illustrating a sample implementation of a system for exploiting visual information for enhancing audio signals via source separation and beamforming according to an embodiment of the present disclosure.
Figure 3:
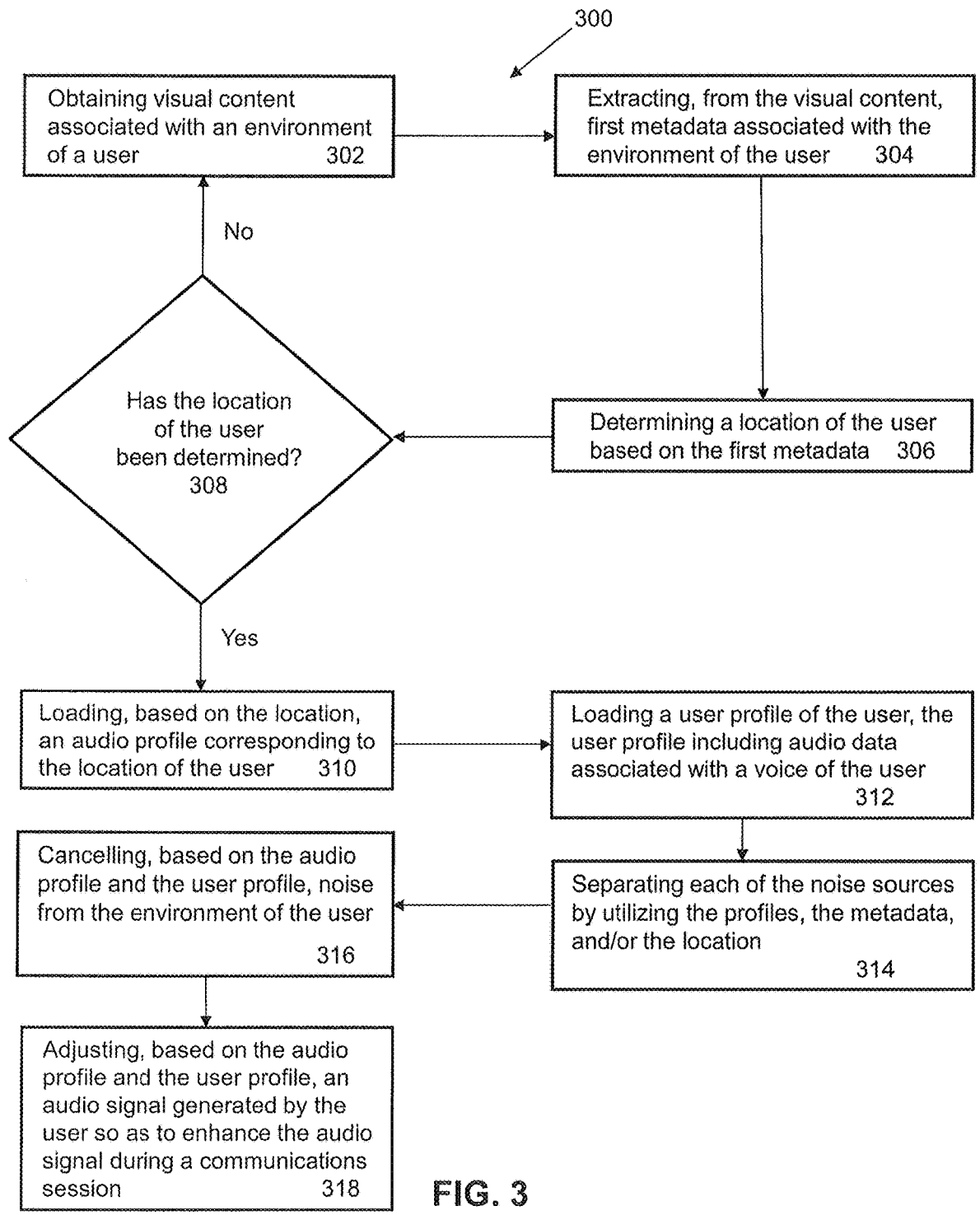
FIG. 3 is a flow diagram illustrating a sample method for exploiting visual information for enhancing audio signals via source separation and beamforming according to an embodiment of the present disclosure.

A system 100 and accompanying methods for exploiting visual information for enhancing audio signals via source separation and beamforming are disclosed, as shown in FIGS. 1-3. In particular, the system 100 and methods utilize metadata extracted from visual, audio, or other content associated with an environment of a user to improve the speed and efficiency of noise suppression algorithms used in enhancing various types of communications sessions. In order to accomplish this, the system 100 and methods may utilize visual sensors, cameras, audio sensors, and other similar devices to capture visual content, audio content, or other content associated with an acoustic environment of the user during a communications session of the user. The captured visual, audio, or other content may include content associated with anything located within the environment, such as, but not limited to, people, vehicles, machinery, or anything capable of making noise in the environment or otherwise. Once the visual, audio, or other content is captured, metadata extracted from the captured content may be utilized by the system 100 and methods to identify the user's location and to load a pre-trained audio profile that includes information associated with the current noise conditions in the acoustic environment. In parallel, the system 100 and methods may load a user profile for the user, which may include corresponding audio information that is associated with the user.

Once the audio profile and the user profile are loaded, the system 100 and methods may use the audio profile and user profile to separate each of the noise sources and to cancel any noise generated in the acoustic environment that competes with the user's communications. For example, the system 100 and methods may cancel noise in the acoustic environment by transmitting nulls toward the interfering noise sources in the environment. Additionally, the audio and user profiles may also be utilized by the system 100 and methods to enhance audio signals generated by the user during the user's communications session. Such communications sessions may include, but are not limited to telephone communications sessions, automatic speech recognition sessions, or any other type of communications sessions. Thus, the system 100 and methods may utilize captured visual, auditory, or other information associated with acoustic environments so as to improve noise suppression and improve audio signal quality during communications sessions.

As shown in FIG. 1, a system 100 for exploiting visual, audio, or other information to separate and cancel out noise sources is disclosed. The system 100 may be configured to support, but is not limited to, supporting, content delivery services, automatic speech recognition services, telephone services, cloud computing services, voice-over-internet protocol services (VoIP), software as a service (SaaS) applications, gaming applications and services, productivity applications and services, mobile applications and services, and any other computing applications and services. The system may include one or more users that may utilize first user device 102 to access content, data, and services, to initiate and participate in communications sessions or to perform a variety of other functions. For example, a user may utilize first user device 102 to establish and handle a communications session, such as a telephone call, with another user that may be utilizing second user device 110.

In certain embodiments, the first user device 102 and second user device 110 may be computers, servers, mobile devices, smartphones, computer tablets, phablets, or any other computing devices. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. Similarly, a second user device 110 may include a memory 111 that includes instructions, and a processor 112 that executes the instructions from the memory 111 to perform various operations that are performed by the second user device 110. The processor 112 may be hardware, software, or a combination thereof. Additionally, the second user device 110 may include a camera 113, which may be utilized to capture video, image, or other content.

A first user and a second user may utilize the first user device 102 and second user device 110, respectively, to make telephone calls, and to access and obtain various types of content and services, such as, but not limited to, video content, audio content, web content, text content, automatic speech recognition services, and other speech-related services. Additionally, end users may utilize the first user device 102 and second user device 110 to perform a variety of other tasks and functions. In certain embodiments, the first user device 102 and second user device 110 may include a software application that may be an automatic speech recognition application, a cloud-based application, gaming application, an internet-based application, a browser application, a mobile application, a productivity application, a video application, a music application, a social media application, a financial application, a news application, any other type of application, or a combination thereof. In certain embodiments, the application may be utilized to provide de-noising services to the first and second users. In certain embodiments, at least a portion of the software application may be configured to execute directly on the first user device 102 and second user device 110, however, in other embodiments, the software application may be configured to execute on the other devices and components in the system 100.

The first user of the first user device 102 may be in an environment 114, which may be any type of environment, such as, but not limited to, an airport, a park, an office building, a street, a movie theater, or any other type of environment. In certain embodiments, the second user may be in the same environment 114 as the first user, however, in other embodiments, the second user may be in a different environment from the first user. The environment 114 may include ambient noise. The environment 114 may also include one or more interferers, such as, but not limited to, interferer 115, interferer 120, and interferer 125. The interferers 115, 120, 125 may be any type of object, person, or animal that may make noise in the environment 114 that may potentially interfere with communications made by the first user, the second user, or both. In one embodiment, as shown in FIG. 1, the environment 114 may be an airport, interferer 115 may be a person using a smartphone 116, interferer 120 may be a car, and interferer 125 may be an airplane.

The functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices or any other suitable computing device.

The communications network 135 of the system 100 may be configured to link each of the devices in the system 100 to one another, and be configured to transmit, generate, and receive any information and data traversing the system 100.

In one embodiment, the communications network 135 may include any number of additional servers in addition to the server 140, the server 145, and the server 150. The communications network 135 may also include and be connected to a cloud computing network, a wireless network, an ethernet network, a satellite network, a broadband network, a cellular network, a private network, a cable network, the Internet, an internet protocol network, a multiprotocol label switching (MPLS) network, a content distribution network or any combination thereof. In one embodiment, the communications network 135 may be part of a single autonomous system that is located in a particular geographic region, or be part of multiple autonomous systems that span several geographic regions.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135. Additionally, the database 155 may include a processor and memory or be connected to a processor and memory to perform the various operation associated with the database 155. In certain embodiments, the database 155 may be connected to servers 140, 145, and 150, server 160, visual processing device 210, capturing device 205, audio processing device 215, user device 102, user device 110 or any combination thereof. The database 155 may also store the content obtained from the environment 114, store the metadata extracted from the content, store user profiles and audio profiles, store communications, store information about the interferers 115, 120, 125, store user preferences, store information traversing the system 100 or any combination thereof. Furthermore, the database 155 may be configured to process queries sent to it by any device in the system 100, or system 200, or both.

Operatively, the system 100 may exploit visual and other information to provide for noise source separation and beamforming. In a first example scenario, the first user of the first user device 102 may be engaging in a communications session, such as a telephone call, with the second user of the second user device 110. The environment 114 may include ambient noise and noises made by interferers 115, 120, 125 that may interfere with the quality and perceptibility of the communications occurring during the communications session between the first and second users. In order to counteract such interfering noises in the environment 114, the first user may utilize first user device 102 to cancel out such noises and to enhance the audio signals being transmitted between the first and second user devices 102 and 110. In order to do so, an application on the first user device 102 may activate the camera 105 for a period of time to capture video content, audio content, or other content associated with the environment 114. For example, in FIG. 1, the camera 105 may capture video content, audio content, or a combination thereof, that indicates that the environment 114 is an airport, that the first interferer 115 is a person using a smartphone 116, that the second interferer 120 is a car, and the third interferer 125 is an airplane. In certain embodiments, the system 100 may utilize a microphone array, such as microphone 208, to sample and obtain audio content associated with the environment 114.

Once the visual content, audio content, or other content is obtained by the camera 105, the system 100 may extract or otherwise obtain metadata from the content. The metadata may include, but is not limited to, information that indicates a location of the user, information that indicates a time of day that the content was captured by the camera 105, information that indicates the locations of other users and objects in the environment 114, information that indicates what the interferers 115, 120, 125 are, information that indicates the locations of the interferers 115, 120, 125, information for identifying the audio signals made in the environment 114 and interferers 115, 120, 125, information that identifies the user, information that indicates what the users in the environment 114 are doing, information that indicates a type of environment 114, information that indicates the types of devices being used in the environment 114, any other type of information or a combination thereof.

Based on the captured content and metadata, the system 100 may determine the location of the user, the locations of the interferers 115, 120, 125, the locations of any other object in the environment 114, the location of the environment 114 itself, or a combination thereof. Once the location information is determined, the system 200 may load, such as via the communications network 135, one or more audio profiles including information about the current noise conditions occurring in the environment 114. For example, the audio profile may include audio information, signaling information, noise suppression algorithm information, noise cancellation information, or other information that corresponds to the noise conditions typically found in a given environment. Similarly, audio profiles corresponding to the interferers 115, 120, 125 may also be retrieved and may include audio information, signaling information, noise cancellation information, or other information corresponding to the interferers 115, 120, 125 and the noise conditions made by the interferers 115, 120, 125.

In parallel or at any other selected time, the system 100 may load a user profile corresponding to the first user using the first user device 102. The user profile may include audio information, such as audio information associated with the voice of the first user. Additionally, the user profile may include other information associated with the first user, such as, but not limited to, a name of the first user, the first user's age, the first user's demographic information, an acoustic dictionary corresponding to the first user, the first user's ethnicity, the first user's physical characteristics and any other information. The user profile may also include information indicative of the voice characteristics of the first user, such as, but not limited to the first user's accent information, the first user's tone, the first user's pitch, the first user's speech patterns, the first user's languages, or any other information associated with the first user's speech. In addition to audio and user profiles, the system 100 may also include location profiles may include audio information, location information, or other information specific to a particular location.

Once the audio profile, user profile, location profile, or a combination thereof, are loaded by the system 100, the system 100 may utilize the profiles, location information, or metadata, or a combination thereof, to separate each of the noises sources in the environment 114 from each other and from the first user, and, in certain embodiments, the second user. The system 100 may then utilize the profiles, location information, metadata, or a combination thereof, to improve the efficiency and speed of noise suppression algorithms to be used in cancelling the noises in the environment 114, such as the noises made by the interferers 115, 120, and 125. The system 100, such as via first user device 102, may transmit noise cancellation signals corresponding to the noises made in the environment 114 and by the interferers 115, 120, and 125. In certain embodiments, the audio signals from the environment 114 and the audio signals generated by the interferers 115, 120, and 125 may be suppressed through the use of spatial filtering. Additionally, in certain embodiments, the system 100 may transmit, such as via the first user device 102, nulls corresponding to each of the interferers 115, 120, 125 based on information contained in the profiles. For example, the system 200 may transmit a null in the direction of interferer 120, which is a car in FIG. 1, so as to cancel the noise made by the car.

The system 100 may also include adjusting audio signals generated by the first user, the second user, or a combination thereof, so as to create audio signals of higher quality during the communications session between the first and second users. In certain embodiments, the system 100, such as via the first user device 102, may adjust the audio signals generated by the first user, the second user, or a combination thereof, by utilizing the information contained in the user profiles, audio profiles, location profiles, or a combination thereof. In this way, the system 100 may reconstruct audio signals occurring during the communications session so as to enhance the quality of the communications session for the first and second users.

In another example scenario, instead of having a communication session with the second user, the first user may be utilizing an application on the first user device 102 that involves the use of automatic speech recognition technologies. For example, the first user may be utilizing an application on the first user device 102 to change his travel reservation for a flight for his vacation. The first user may be sitting in an airport environment and may be using a voice interface of the application that is configured to accept voice inputs from the first user to change the reservation or to perform other actions. The automatic speech recognition functions of the application may have difficulty capturing or processing the first user's voice inputs into the interface based on the noisy airport environment. In order to assist in this endeavor, the system 100 may be activated by the first user or the system 100 may be activated automatically when the first user opens the application or at any other designated time. The system 100 may capture video content, audio content, or other content, such as by using the camera 105 of the first user device 102. Metadata extracted from the content may be utilized to retrieve one or more audio profiles, user profiles, location profiles, or a combination thereof, that correspond to the noises detected in the airport environment. For example, an airplane audio profile for airplanes may be loaded, a user profile of the first user may be loaded, and an airport location profile for airports may be loaded by the system 100.

Once the profiles are loaded by the system 100, the system 100 may use the profiles in conjunction with noise suppression algorithms to cancel out each of noises made by each interferer in the airplane environment, along with noises made by any objects in the airplane environment. Additionally, the system 100 may reconstruct higher quality audio signals that are generated by the first user so that the application receiving the voice inputs may more effectively capture the voice inputs via the application. The higher quality audio signals may enable the automatic speech recognition software to process the voice inputs in a more efficient manner as well.

In another sample scenario, the system 100 may include having the first user using the first user device 102 make a phone call to the second user using the second user device 110. The first user may be in an environment 114 that includes a very busy street in Manhattan. The call may be an important business call and the first user may need audio of the highest possible quality in order to communicate efficiently and effectively with the second user. In this scenario, the system 100 may load a busy street audio profile and the first user's user profile, while cancelling out the noises occurring in the environment 114.

In yet another example scenario, the system 100 may include having the first and second users interacting with a series of digital advertisement signs in an environment 114. The digital advertisement signs may include a microphone array that may obtain audio signals on the first and second users interacting with the digital advertisements signs, while cancelling out ambient noise occurring in the environment 114. A camera on the digital advertisement signs may be utilized to locate the first and second users, and, in parallel, locate competing speakers and noise sources by capturing video content, audio content, or other content associated with the environment 114. The system 100 may transmit nulls in the direction of the competing speakers and noise sources based on profiles corresponding to the speakers and noise sources and based on metadata extracted from the captured content. Furthermore, the metadata may be utilized by the system 100 to post-process the captured audio efficiently and deliver the highest possible quality to a human-computer interface.

Notably, as shown in FIG. 1, the system 100 may perform any of the operative functions disclosed herein by utilizing the processing capabilities of server 160, the storage capacity of the database 155 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, obtaining visual, audio, or other content associated with the environment of the user, extracting metadata from the obtained content, determining a location of the user based on the metadata, loading an audio profile corresponding to the location of the user, loading a user profile of the user that is associated with the user, cancelling noise from the environment based on the user profile and audio profile, adjusting audio signals generated by a user based on the user profile and audio profile, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 110, a first interferer 115, a second interferer 120, a third interferer 125, communications network 135, a server 140, a server 145, a server 150, a server 160, and a database 155. However, the system 100 may include multiple first user devices 105, multiple second user devices 110, multiple interferers 115, 120, 125, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that may be connected to system 100, such as system 200.

Referring now also to FIG. 2, a system 200 for exploiting visual, audio, or other information to separate and cancel out noise sources is disclosed. Notably, system 200 may incorporate and utilize any of the components, devices, and functionality of system 100. In certain embodiments, system 200 may be connected to system 100, such as via the communications network 135. A user of the system 200 may be participating in a communications session involving a conversation 220, an automatic speech recognition process 225, or other speech-involved processes. The system 200 may include a capturing device 205, which may be configured to capture audio inputs, video inputs, or other types of inputs occurring in the environment 114. The capturing device 205 may include a memory 206 configured to store instructions and a processor 207 that is configured to execute the instructions to perform the various operations performed by the capturing device 205. The capturing device 205 may be configured to obtain visual content, audio content, or other content, such as by utilizing microphone 208 and one or more cameras 209. In certain embodiments, the microphone 208 may be embodied as a microphone array.

Once the visual content, audio content, other content, or a combination thereof, are captured by the capturing device 205, the visual processing device 210 may process the visual content and the audio processing device 215 may process the audio content. The visual processing device 210 and the audio processing device 215 may be hardware, software, or a combination thereof. When the visual processing device 210 processes the visual content, the visual processing device 210 may obtain metadata from the visual content so as to provide the system 200 with information indicative of the environment 114 and with information utilized to separate the various noise sources in the environment 114. The audio processing device 210 may process the audio content occurring in the environment 114. The system 200 may process the audio content, video content, other content, and metadata to determine a location of the user involved in the conversation 220, automatic speech recognition process 225, or other speech-involved process. The system 200 may also determine the locations of any other object in the environment 114 of the user. Once obtained, the metadata and location information may be utilized by the system 200 to retrieve and load one or more profiles corresponding to the environment and noise sources in the environment 114 from the communications network 135, which may be a cloud-based network. The profiles may be, but are not limited to, audio/noise profiles, user profiles, and location profiles, such as those described herein.

Once the profiles are loaded by the system 200, the system 200 separate the various noise sources in the environment 114 and may cancel the noise corresponding to each of the noise sources by utilizing the profiles. For example, if the environment 114 includes noise sources, such as a car and a plane, the system 200 may utilize a car noise profile and a plane noise profile to cancel the noises generated by the car and the plane respectively. Similarly, if the location is an airport, a location profile including noise information associated with an airport may be utilized by the system 200 to cancel noises occurring in the airport. The system 200 may cancel the noises in the environment by utilizing the profiles in conjunction with available noise suppression algorithms.

Additionally, the system 200 may adjust audio signals, such as speech, from the user so as to improve the quality of communications during a conversation 220, automatic speech recognition process 225, or any other speech-related process. The system 200 may adjust the audio signals from the user by utilizing the user's profile, which may include an acoustic dictionary corresponding to the user's language, a sampling of the user's speech, or other information associated with the user. The system 200 may update the user's profile or other profiles based on separation, cancellation, and audio signal adjusting processes in real-time or at any other selected time. As a result, the profiles may be adapted to the user as conditions associated with the user change.

Although FIG. 2 illustrates specific example configurations of the various components of the system 200, the system 200 may include any configuration of the components, which may include using a greater or lesser number of the components. For example, the system 200 is illustratively shown as including a capturing device 205, a visual processing device 210, an audio processing device 215, and a communications network 135. However, the system 200 may include multiple capturing devices 205, multiple visual processing devices 210, multiple audio processing devices 215, multiple communications networks 135, or any number of any of the other components in the system 200. Furthermore, in one embodiment, substantial portions of the functionality and operations of the system 200 may be performed by other networks and systems that may be connected to system 200, such as system 100.

As shown in FIG. 3, an exemplary method 300 for exploiting visual information for enhancing audio signals via source separation and beamforming is schematically illustrated, and may include, at step 302, obtaining visual content, audio content, other content, or any combination thereof, for an environment 114 of a user, such as during a communications session of the user. In one embodiment, the obtaining of the content may be performed by the first user device 102, the second user device 110, the capturing device 205, any combination thereof, or by any other appropriate device. At step 304, the method 300 may include extracting metadata from the visual content, audio content, other content, or any combination thereof. The metadata may include, but is not limited to, information that indicates a location of the user, information associated with the time of day that the content was captured, information that indicates the locations of other users and objects in the environment 114, information that identifies the user, information that indicates what the users in the environment 114 are doing, information that indicates a type of environment 114, types of devices being used in the environment 114, any other type of information, or a combination thereof.

At step 306, the method 300 may include determining a location of the user based on the extracted metadata. In certain embodiments, the method 300 may also include determining the specific locations of any object in the environment 114 of the user based on the metadata as well. The objects may be sources of noise, such as but not limited to, competing speakers, inanimate objects, machinery, animals, or any other object that may generate or make noise. In certain embodiments, the determining of the location or locations may be performed by the first user device 102, the second user device 110, the capturing device 205, the visual processing device 210, the audio processing device 215, the servers 140, 145, 150, 160, any combination thereof, or by any other appropriate device. At step 308, the method 300 may including determining if the location of the user has been determined based on the metadata. If the location of the user has not been determined, the method 300 may include going back to step 302 to obtain visual content associated with the environment 114 of the user until the location of the user is determined.

If, however, the location of the user has been determined, the method 300 may include, at step 310, loading, based on the determined location, an audio profile corresponding to the location of the user. For example, the audio profile may include information that corresponds to noise conditions associated with the location of the user, noise signaling information that may be utilized to cancel the noise conditions, noise suppression algorithms, or any other desired information. In certain embodiments, the location profiles may also be utilized and may include audio information specific to the location. In certain embodiments, the audio profile may be loaded by using the first user device 102, the second user device 110, the capturing device 205, the visual processing device 210, the audio processing device 215, the servers 140, 145, 150, 160, any combination thereof, or by any other appropriate device. At step 312, the method 300 may include loading a user profile of the user. The user profile may include audio information, such as audio information associated with a voice of the user. Additionally, the user profile may include information associated with the user, such as, but not limited to, a name of the user, the user's age, the user's demographic information, an acoustic dictionary corresponding to the user, the user's ethnicity, the user's physical characteristics, and any other information. The user profile may also include information indicative of the voice characteristics of the user, such as, but not limited to the user's accent, the user's tone, the user's pitch, the user's speech patterns, the user's languages, or any other information associated with the user's voice. In certain embodiments, the user profile may be loaded by using the first user device 102, the second user device 110, the capturing device 205, the visual processing device 210, the audio processing device 215, the servers 140, 145, 150, 160, any combination thereof, or by any other appropriate device.

At step 314, the method 300 may include separating each of the noise sources in the environment 114 that may be interfering with the user's communications session, such as by utilizing the profiles, the metadata, the determined locations, or a combination thereof. Each of the noise sources may also be separated from the user as well. In certain embodiments, the noise sources may be separated by utilizing the first user device 102, the second user device 110, the capturing device 205, the visual processing device 210, the audio processing device 215, the servers 140, 145, 150, 160, any combination thereof. At step 316, the method 300 may include cancelling the noise in the environment 114 interfering with the communications session of the user. The noise may be cancelled by utilizing the information contained in the audio profile, the user profile, or a combination thereof. In certain embodiments, the cancelling of the noise in the environment 114 may be performed by utilizing the first user device 102, the second user device 110, the capturing device 205, the visual processing device 210, the audio processing device 215, the servers 140, 145, 150, 160, any combination thereof, or by any other appropriate device. In certain embodiments, the noise in the environment 114 may be cancelled by transmitting nulls or noise cancellation signals corresponding to each of the noise sources in the direction of the noise sources. At step 318, the method 300 may include adjusting, based on one or more of the profiles, audio signals generated by the user during the communications session so as to enhance the audio signals during the communications session. For example, speech generated during a telephone call or an automatic speech recognition process may be enhanced. In certain embodiments, the audio signals may be adjusted by utilizing the first user device 102, the second user device 110, the capturing device 205, the visual processing device 210, the audio processing device 215, the servers 140, 145, 150, 160, any combination thereof, or by any other appropriate device.

Notably, the system 100, system 200, and methods disclosed herein may include additional functionality and features. In certain embodiments, the video content, audio content, or other content may be obtained by utilizing any type of sensor, such as, but not limited to, any visual sensor, any acoustic sensor, any recording device, any light sensor, any other type of sensor, or a combination thereof. Additionally, in certain embodiments, the audio profile, the user profile, location profile, or a combination thereof, may be retrieved by utilizing a cloud-based application configured to execute on the first user device 102, the second user device 110, the capturing device 205, the servers 140, 145, 150, 160, any combination thereof, or by any other appropriate device. The cloud-based application may retrieve the profiles via the communications network 135, which may be a cloud-based network. In certain embodiments, the profiles may be updated based on the visual content, audio, content, other content, metadata, or a combination thereof, obtained by the system 100. For example, if metadata associated with video content of an airport environment indicates that the airport audio profile should be adjusted to reflect the current conditions at the airport environment, the airport audio profile may be updated accordingly. In certain embodiments, the profiles may be stored in a library residing on the database 155 and may be updated as new content is captured in the system 100.

The system 100, the system 200, and methods disclosed herein may further include utilizing microphone arrays, beamformers, or a combination thereof, to sample audio signals captured from the environment 114. The microphone arrays may be utilized to assist in suppressing some of the components of the captured audio signals through spatial filtering or other similar techniques. For example, noise being generated by the interferers 115, 120, 125, other interferers in the environment 114, or a combination thereof, may be cancelled out by suppressing components of the audio signals made by such interferers. It is important to note that the methods described above may incorporate any of the functionality, devices, and/or features of the system 100, system 200, and subsystems described above, or otherwise, and are not intended to be limited to the description or examples provided herein.

Figure 4:
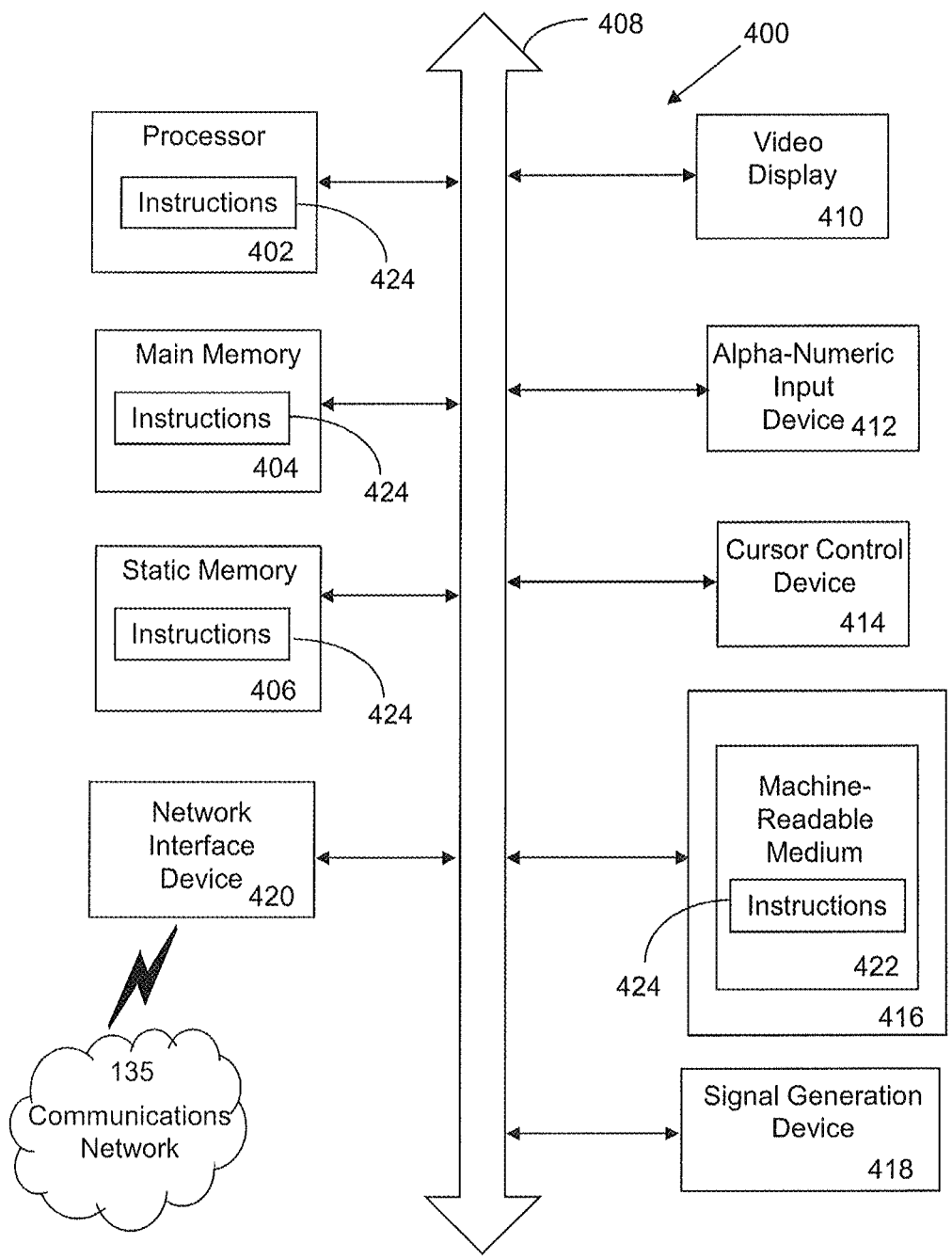
FIG. 4 is a schematic diagram of a machine in the form of a computer system within which a set of instructions, when executed, may cause the machine to perform any one or more of the methodologies or operations of the systems and methods for exploiting visual information for enhancing audio signals via source separation and beamforming.

Referring now also to FIG. 4, at least a portion of the methodologies and techniques described with respect to the exemplary embodiments of the system 100 and system 200 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100 and the system 200. For example, the machine may be configured to, but is not limited to, assist the system 100 and the system 200 by providing processing power to assist with processing loads experienced in the system 100 and the system 200, by providing storage capacity for storing instructions or data traversing the system 100 and the system 200, or by assisting with any other operations conducted by or within the system 100 and the system 200.

In some embodiments, the machine may operate as a standalone device. In some embodiments, the machine may be connected (e.g., using communications network 135, another network, or a combination thereof) to and assist with operations performed by other machines, such as, but not limited to, the first user device 102, the second user device 110, the server 140, the server 145, the server 150, the database 155, the server 160, the capturing device 205, the visual processing device 210, the audio processing device 215, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, other network, or both, can send or receive voice, video or data, and to communicate over the communications network 135, other network, or both, using the instructions. The instructions 424 may further be transmitted or received over the communications network 135, other network, or both, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
extracting, from media content, first metadata, wherein the first metadata indicates information that identifies an interferer generating noise in an environment, information that identifies a location of the interferer, and information that identifies what a user is doing;
cancelling, based on the first metadata, an audio profile loaded based on a location of the user, and a user profile comprising audio data associated with the user, the noise from the environment; and
modifying, based on the audio profile and the user profile, an audio signal generated by the user.

2. The system of claim 1, wherein the operations further comprise determining the location of the user based on the first metadata.

3. The system of claim 1, wherein the operations further comprise enhancing the audio signal generated by the user.

4. The system of claim 1, wherein the operations further comprise loading the audio profile corresponding to the location of the user, wherein the audio profile comprises information corresponding to a noise condition associated with the location of the user, noise signaling information for cancelling the noise condition, a noise suppression algorithm, or a combination thereof.

5. The system of claim 1, wherein the operations further comprise loading the user profile, wherein the user profile includes audio information associated with the user, a name of the user, an age of the user, demographic information associated with the user, an acoustic dictionary corresponding to the user, an ethnicity of the user, a physical characteristic of the user, or a combination thereof.

6. The system of claim 1, wherein the operations further comprise separating each source of a plurality of sources contributing to the noise.

7. The system of claim 6, wherein the operations further comprise separating each source of the plurality of sources from the user.

8. The system of claim 1, wherein the operations further comprise retrieving the audio profile, the user profile, or a combination thereof, from a cloud-based application.

9. The system of claim 1, wherein the operations further comprise updating the audio profile, the user profile, or a combination thereof, based on the media content, other content, or a combination thereof.

10. The system of claim 1, wherein the operations further comprise updating the audio profile, the user profile, or a combination thereof, as conditions associated with an environment of the user change over time.

11. The system of claim 1, wherein the operations further comprise utilizing a microphone array, a beamformer, or a combination thereof, to sample an audio signal captured in an environment of the user.

12. The system of claim 11, wherein the operations further comprise suppressing a component of the audio signal captured in the environment of the user.

13. A method, comprising:
extracting, from media content and by utilizing instructions from a memory that are executed by a processor, first metadata, wherein the first metadata indicates information that identifies an interferer generating noise in an environment, information that identifies a location of the interferer, and information that identifies what a user is doing;
cancelling, based on the first metadata, an audio profile loaded based on a location of the user, and a user profile comprising audio data associated with the user, the noise from the environment; and
adjusting, based on the audio profile and the user profile, an audio signal generated by the user.

14. The method of claim 13, further comprising obtaining the media content, wherein the media content is associated with an environment of the user.

15. The method of claim 13, further comprising increasing, by utilizing the first metadata, an efficiency of a noise suppression algorithm utilized to cancel the noise.

16. The method of claim 13, further comprising transmitting a null in a direction of the interferer generating the noise.

17. The method of claim 13, further comprising delivering the audio signal to a human-computer interface.

18. The method of claim 13, further comprising activating a system including the processor when the user opens an application.

19. The method of claim 13, further comprising updating the audio profile, the user profile, or a combination thereof, based on the media content, other content, or a combination thereof.

20. A non-transitory computer-readable device comprising instructions, which when executed by a processor, cause the processor to perform operations comprising:
obtaining, from media content, first metadata, wherein the first metadata indicates information that identifies an interferer generating noise in an environment, information that identifies a location of the interferer, and information that identifies what a user is doing;
cancelling, based on the first metadata, an audio profile loaded based on a location of the user, and a user profile comprising audio data associated with the user, the noise from the environment; and
adjusting, based on the audio profile and the user profile, an audio signal generated by the user.

* * * * *